(12) United States Patent
Koizumi et al.

(10) Patent No.: US 9,088,743 B2
(45) Date of Patent: *Jul. 21, 2015

(54) SCANNING CIRCUIT FOR IMAGE PICKUP APPARATUS

(75) Inventors: Toru Koizumi, Kanagawa (JP); Tetsunobu Kochi, Kanagawa (JP); Hiroki Hiyama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 707 days.

This patent is subject to a terminal disclaimer.

(21) Appl. No.: 13/168,754

(22) Filed: Jun. 24, 2011

(65) Prior Publication Data

US 2011/0249164 A1  Oct. 13, 2011

Related U.S. Application Data

(62) Division of application No. 12/348,996, filed on Jan. 6, 2009, now Pat. No. 7,995,127, which is a division of application No. 09/929,037, filed on Aug. 15, 2001, now Pat. No. 7,688,371.

(30) Foreign Application Priority Data

Aug. 25, 2000 (JP) ................................. 2000-256354

(51) Int. Cl.
*H04N 3/14* (2006.01)
*H04N 5/335* (2011.01)
(Continued)

(52) U.S. Cl.
CPC .................. *H04N 5/361* (2013.01); *H04N 1/40* (2013.01); *H04N 5/378* (2013.01)

(58) Field of Classification Search
CPC ................ H01L 2924/00; H01L 2924/00014; H01L 2224/48247; H01L 2924/00012; H04N 13/0409; H04N 13/0422; H04N 13/0434; H04N 13/0438

USPC .................................. 348/302, 304, 307–310
See application file for complete search history.

(56) References Cited

U.S. PATENT DOCUMENTS 4,942,474 A * 7/1990 Akimoto et al. ............... 348/301
5,134,428 A   7/1992 Kline et al. .................... 346/163
(Continued)

FOREIGN PATENT DOCUMENTS

JP  2000-196947   7/2000
JP  2000-224495   8/2000

OTHER PUBLICATIONS

U.S. Appl. No. 09/471,082, filed Dec. 23, 1999.

*Primary Examiner* — Twyler Haskins
*Assistant Examiner* — Carramah J Quiett
(74) *Attorney, Agent, or Firm* — Fitzpatrick, Cella, Harper & Scinto

(57) ABSTRACT

This invention provides an image pickup device comprising a plurality of pixels each including a photoelectric conversion unit, a semiconductor area to which a signal from the photoelectric conversion unit is transferred, a transfer switch for transferring the signal from the photoelectric conversion unit to the semiconductor area, and a read unit for reading out the signal from the semiconductor area, and a drive circuit for outputting a first level at which the transfer switch is set in an OFF state, a second level at which the transfer switch is set in an ON state, and a third level between the first level and the second level, wherein the drive circuit controls to hold the third level for a predetermined time while the transfer switch is changing from the ON state to the OFF state.

22 Claims, 10 Drawing Sheets

(51) Int. Cl.
  *H01L 27/00* (2006.01)
  *H04N 5/361* (2011.01)
  *H04N 1/40* (2006.01)
  *H04N 5/378* (2011.01)
  *H04N 5/228* (2006.01)

(56) References Cited

U.S. PATENT DOCUMENTS

| | | | |
|---|---|---|---|
| 5,187,583 A | 2/1993 | Hamasaki | 358/213.15 |
| 5,504,526 A | 4/1996 | Miyagawa et al. | 348/313 |
| 5,786,852 A | 7/1998 | Suzuki et al. | 348/312 |
| 5,828,407 A | 10/1998 | Suzuki | 348/312 |
| 5,856,667 A | 1/1999 | Spirig et al. | 250/208.1 |
| 5,933,188 A | 8/1999 | Shinohara | 348/302 |
| 5,990,952 A | 11/1999 | Hamasaki | 348/311 |
| 6,002,287 A | 12/1999 | Ueno et al. | 327/307 |
| 6,023,293 A | 2/2000 | Watanabe et al. | 348/294 |
| 6,140,630 A | 10/2000 | Rhodes | 250/208.1 |
| 6,344,877 B1 | 2/2002 | Gowda et al. | 348/245 |
| 6,410,899 B1 | 6/2002 | Merrill et al. | 250/208.1 |
| 6,507,519 B1 | 1/2003 | Collins et al. | 365/185.28 |
| 6,510,193 B1 | 1/2003 | Kochi et al. | 377/60 |
| 6,567,571 B1 | 5/2003 | Kochi et al. | 382/312 |
| 6,587,603 B1 | 7/2003 | Sakurai et al. | 382/312 |
| 6,633,334 B1 | 10/2003 | Sakurai et al. | 348/308 |
| 6,650,369 B2 | 11/2003 | Koizumi et al. | 348/301 |
| 6,653,617 B2 | 11/2003 | Hiyama et al. | 250/214.1 |
| 6,674,471 B1 | 1/2004 | Masuyama | 348/312 |
| 6,757,016 B1 | 6/2004 | Ueno et al. | 348/279 |
| 6,831,685 B1 | 12/2004 | Ueno et al. | 348/243 |
| 6,839,084 B1 | 1/2005 | Hiyama et al. | |
| 6,850,278 B1 | 2/2005 | Sakurai et al. | 348/302 |
| 6,946,636 B2 | 9/2005 | Eguchi et al. | 250/208.1 |
| 6,963,372 B1 | 11/2005 | Hiyama et al. | 348/308 |
| 6,965,408 B2 | 11/2005 | Hiyama et al. | 348/308 |
| 6,995,800 B2 | 2/2006 | Takahashi et al. | 348/340 |
| 7,015,964 B1 | 3/2006 | Koizumi et al. | 348/301 |
| 7,067,792 B2 | 6/2006 | Cazaux et al. | 250/214.1 |
| 7,071,980 B2 | 7/2006 | Yuki et al. | 348/308 |
| 7,081,607 B1 | 7/2006 | Koizumi | 250/208.1 |
| 7,129,985 B1 | 10/2006 | Koizuma et al. | 348/372 |
| 7,142,233 B1 | 11/2006 | Ogawa et al. | 348/222.1 |
| 7,456,882 B1 | 11/2008 | Hiyama et al. | 348/294 |
| 7,554,385 B2 | 6/2009 | Ishida | 327/536 |
| 7,688,371 B2 * | 3/2010 | Koizumi et al. | 348/308 |
| 2007/0013796 A1 | 1/2007 | Ueno et al. | 348/272 |

* cited by examiner

PHOTODIODE AREA | TRANSFER SW AREA | FLOATING DIFFUSION AREA

SCANNING CIRCUIT FOR IMAGE PICKUP APPARATUS

This application is a divisional of U.S. application Ser. No. 12/348,996 filed Jan. 6, 2009, now allowed, which is a divisional of application Ser. No. 09/929,037, filed Aug. 25, 2001, now U.S. Pat. No. 7,688,371, the content of each of which are incorporated by reference herein.

BACKGROUND OF THE INVENTION

1. Field of the Invention

The present invention relates to an image pickup apparatus for picking up an object image and a drive method therefor.

2. Related Background Art

As typical solid-state image pickup element, an element formed from a photodiode and CCD shift register and an element called an APS (Active Pixel Sensor) formed from a photodiode and MOS transistor are known.

An APS includes for each pixel, a photodiode, MOS switch, amplification circuit for amplifying a signal from the photodiode, and has may technological advantages that XY addressing is possible, and a sensor and signal processing circuit can be formed on one chip, for example. However, since many elements are included in one pixel, the chip size that determines the scale of the optical system can hardly be reduced, so CCDs are currently most popular. An APS has received a great deal of attention because the MOS transistor micropatterning technique is improved, and strong demands have arisen to "make a sensor and signal circuit on one chip" or to "reduce power consumption".

FIG. 13 is an equivalent circuit diagram of an APS. Referring to FIG. 13, a transfer switch Q1 transfers photocharges from a photodiode 101 to a floating diffusion area (FD). A reset switch Q2 resets the floating diffusion area. An input MOS transistor Q3 is included in a source follower for outputting the voltage in the floating diffusion area. A selection switch Q4 selects a pixel. The APS also includes a power supply line 102, reset switch control line 103, transfer switch control line 104, selection switch control line 105, and signal output line 106. The operation of the APS using a scheme, in which the selection switch control line 105 for controlling the selection switch Q4 is commonly arranged in the row direction so as to select a row and transfer charges of one row to a line memory at a time, will be described.

FIG. 14 shows a drive pulse used to read out a pixel (row).

Before the start of accumulation operation, while keeping the reset switch Q2 turned on, the transfer switch Q1 is turned on to temporarily reset the photodiode 101, as shown in FIG. 14. The floating diffusion area is set in the floating state, and the selection switch for reading-out is turned on. A voltage corresponding to the voltage in the floating diffusion area is output to the signal output line 106 by a source follower formed from a load connected to the input MOS transistor Q3 and signal output line 106. This output is sampled into a memory. That is, reset noise is sampled. After that, to transfer the photo-signal charges to the floating diffusion area (FD), the transfer switch is turned on and off. Transfer is done while keeping the floating diffusion area in the floating state. For this reason, the voltage in the floating diffusion area is a voltage lower than a voltage Vres immediately after the reset, by Q/CFD (Q is transferred charges, and CFD is the capacitance of the FD portion), which is given by $$VFD = Vres - Q/CFD$$

That is, Q/CFD is superposed on the reset voltage containing different reset noise components at each reset. Since a signal corresponding to the voltage is output to the signal output line 106, this signal is sampled ("photo-signal plus sampling of reset noise" in FIG. 14).

Finally, the "reset noise" signal and "photo-signal+reset noise" signal are subtracted from the photo-signal by a differentiating circuit whereby the reset noise which is reset to different voltages at each reset can be removed.

Especially, when a buried photodiode is used as the photodiode 101 in FIG. 13, the reset noise can be completely removed, and a high S/N ratio can be obtained.

However, recent APSs have problems of a residual image and random noise. The reasons for this will be described below in detail.

As described above, recent APSs use micropatterned MOS transistors, thereby realizing a small pixel size. For this reason, a residual image or random noise due to new reasons based on the micropatterned MOS transistors occurs.

FIG. 15 is a sectional view of an APS using a micropatterned MOS transistor. FIG. 16 is a potential chart corresponding to the sectional view of FIG. 16. As shown in FIG. 15, a surface p-type area 304 is formed on an n-type area 305 of a photodiode (called a buried photodiode). Charges accumulated in the n-type area 305 are completely transferred to a floating diffusion area 303 through a transfer switch (SW) 302 by a depletion layer extending from a PWL (p-well) 301 and surface p-type area 304. The floating diffusion area 303 is connected to a reset electrode 307 through a reset switch (SW) and can be set to a predetermined reset potential.

In the APS using a micropatterned MOS transistor, a potential pocket and barrier are formed, as indicated by A and B in FIG. 16. As a result, some of charges in the transfer switch area return to the photodiode to generate a residual image or random noise.

The pocket (A in FIG. 16) and barrier (B in FIG. 16) of the potential will be described in more detail.

To form a micropatterned MOS transistor, annealing in the manufacturing process must be executed at a lower temperature in a shorter time. Hence, an impurity, such as boron or phosphorus, for determining the conductivity type is diffused not only simply by heat but also through defects and the like, i.e., the influence of transient enhanced diffusion phenomenon becomes conspicuous. As a result, boron for determining the p-type well region segregates to an area corresponding to B in FIG. 16, thereby forming a potential barrier. This phenomenon is known as a reverse short channel effect in a micropatterned MOS transistor.

Such a phenomenon typically occurs in an area having a channel length L of 1 μm or less and, more particularly, a channel length L equal to or smaller than 0.7 μm.

On the other hand, an area corresponding to A in FIG. 16, i.e., a portion where the n-type area 305 of the photodiode 101 connects to the transfer switch 302 determines the signal charge transfer characteristic. The positional relationship between the surface p-type area 304 and the n-type area 305 of the photodiode is very important. Especially when a micropatterned MOS transistor is used, the voltage to be applied to the gate of the transfer switch 302 must be reduced. In this case, however, the potential of the transfer switch cannot be sufficiently dropped, and the charges are difficult to be transferred. In some cases, to promote charge transfer, an n-type bypass area 308 is positively formed, as shown in FIG. 15.

The width of such a bypass area 308 is 0 to 0.5 μm. If the bypass area 308 is too narrow, transfer is difficult. If the transfer width is too large, a potential pocket is formed. When the voltage applied to the gate of the transfer switch 302 is high, the voltage can compensate for transfer, and be designed as a value that prevents any potential pocket. However, when a micropatterned MOS transistor is used, the voltage cannot compensate for transfer, and the width controllability is as strict as 0.05 μm or less, i.e., a stricter controllability than that for the gate length of a micropatterned MOS transistor is required. As a consequence, a potential pocket is readily formed.

In the conventional art, charges remain under the gate of the transfer switch 302 due to the above-described potential pocket (A in FIG. 16) or potential barrier (B in FIG. 16).

The remaining amount is given by $$\text{Remaining amount} \propto (VTXH - VTXth - VFD)$$

where VTHX is the high-level gate voltage of the transfer switch 302, VTXth is the threshold voltage of the transfer switch 302, and VFD is the voltage in the floating diffusion area.

When some or all of the residual charges return to the photodiode, a residual image is generated. Depending on the operation condition, residual charges are generated even in a dark state and return to the photodiode. The residual charges thermally fluctuate to make random noise.

FIGS. 17A to 17D show potential states when the transfer switch is turned on and off. FIG. 17A is a potential chart showing a state immediately after the floating diffusion area is reset. Signal charges are accumulated in the photodiode. FIG. 17B is a potential chart showing a state wherein the transfer switch is turned on to transfer the signal charges to the floating diffusion area. At this time, the potential of the floating diffusion area is increased by the signal charges.

Since the surface potential under the gate of the transfer switch becomes lower than the potential in the floating diffusion area depending on the amount of signal charges, charges are generated even under the gate of the transfer switch. FIG. 17C shows a state wherein the transfer switch is turned off, i.e., a state wherein charges induced under the gate of the transfer switch cannot completely move to the floating diffusion area. The charges that cannot completely move return to the photodiode side to cause a residual image or random noise.

In a CCD, the power supply voltage is high. For this reason, even when maximum signal charges are transferred, the surface potential of the transfer switch is always higher than the vertical CCD potential, and no charges are generated under the gate of the transfer switch.

In the APS using a micropatterned MOS transistor, the power supply voltage is low. For this reason, when at least maximum signal charges are transferred, the state shown in FIG. 17B occurs, and a potential relationship as in a CCD can hardly be formed. In addition, when the reset voltage is low, the state shown in FIG. 17B occurs even in a dark state, resulting in random noise in the dark state.

SUMMARY OF THE INVENTION

It is an object of the present invention to obtain an image almost free from noise.

In order to achieve the above object, according to an aspect of the present invention, there is provided an image pickup apparatus comprising a plurality of pixels each including a photoelectric conversion unit, a semiconductor area to which a signal from the photoelectric conversion unit is transferred, a transfer switch adapted to transfer the signal from the photoelectric conversion unit to the semiconductor area, and a read unit adapted to read out the signal from the semiconductor area, and a drive circuit adapted to output a first level at which the transfer switch is set in an OFF state, a second level at which the transfer switch is set in an ON state, and a third level between the first level and the second level, wherein the drive circuit controls to hold the third level for a predetermined time while the transfer switch is changing from the ON state to the OFF state.

According to another aspect, there is provided an image pickup apparatus comprising a plurality of pixels each including a photoelectric conversion unit, a semiconductor area to which a signal from the photoelectric conversion unit is transferred, a transfer switch adapted to transfer the signal from the photoelectric conversion unit to the semiconductor area, and a read unit adapted to read out the signal from the semiconductor area, and a drive circuit adapted to output a signal for controlling the transfer switch so that a time during which the transfer switch changes from an ON state to an OFF state becomes longer than a time during which the transfer switch changes from the OFF state to the ON state.

According to still another aspect, there is provided an image pickup apparatus comprising a plurality of pixels each including a photoelectric conversion unit, a semiconductor area to which a signal from the photoelectric conversion unit is transferred, a transfer switch adapted to transfer the signal from the photoelectric conversion unit to the semiconductor area, and a read unit adapted to read out the signal from the semiconductor area, and a drive circuit adapted to control the transfer switch, wherein a substantial driving force of the drive circuit for changing the transfer switch from an OFF state to an ON state is higher than a substantial driving force for changing the transfer switch from the ON state to the OFF state.

According to still another aspect, there is provided an image pickup apparatus comprising a plurality of pixels each including a photoelectric conversion unit, a semiconductor area to which a signal from the photoelectric conversion unit is transferred, a transfer switch adapted to transfer the signal from the photoelectric conversion unit to the semiconductor area, and a read unit adapted to read out the signal from the semiconductor area, and a drive circuit adapted to control the transfer switch, wherein the transfer switch comprises a transistor of a first conductivity type, and the drive circuit includes at least a structure formed by connecting the transistors of the first conductivity type in series.

According to still another aspect, there is provided an image pickup apparatus comprising a plurality of pixels each including a photoelectric conversion unit, a semiconductor area to which a signal from the photoelectric conversion unit is transferred, a transfer switch adapted to transfer the signal from the photoelectric conversion unit to the semiconductor area, and a read unit for reading out the signal from the semiconductor area, and a drive circuit adapted to output a signal for controlling the transfer switch so that a fall speed Voff for changing the transfer switch from an ON state to an OFF state has a relation 10 V/μsec>Voff.

According to still another aspect, there is provided an image pickup apparatus comprising a plurality of pixels each including a photoelectric conversion unit, a semiconductor area to which a signal from the photoelectric conversion unit is transferred, a transfer switch adapted to transfer the signal from the photoelectric conversion unit to the semiconductor area, and a read unit adapted to read out the signal from the semiconductor area, and a drive circuit adapted to control the transfer switch, wherein the drive circuit includes a constant current circuit.

According to still another aspect, there is provided a drive method for an image pickup apparatus including a plurality of pixels each including a photoelectric conversion unit, a semiconductor area to which a signal from the photoelectric conversion unit is transferred, a transfer switch adapted to transfer the signal from the photoelectric conversion unit to the semiconductor area, and a read unit adapted to read out the signal from the semiconductor area, comprising:

an output step of outputting a first level at which the transfer switch is set in an OFF state, a second level at which the transfer switch is set in an ON state, and a third level between the first level and the second level, wherein the third level is held for a predetermined time while the transfer switch is changing from the ON state to the OFF state.

According to still another aspect, there is provided a drive method for an image pickup apparatus including a plurality of pixels each including a photoelectric conversion unit, a semiconductor area to which a signal from the photoelectric conversion unit is transferred, a transfer switch adapted to transfer the signal from the photoelectric conversion unit to the semiconductor area, and a read unit adapted to read out the signal from the semiconductor area, comprising:

an output step of outputting a signal for controlling the transfer switch so that a time during which the transfer switch changes from an ON state to an OFF state becomes longer than a time during which the transfer switch changes from the OFF state to the ON state.

According to still another aspect, there is provided a drive method for an image pickup apparatus including a plurality of pixels each including a photoelectric conversion unit, a semiconductor area to which a signal from the photoelectric conversion unit is transferred, a transfer switch adapted to transfer the signal from the photoelectric conversion unit to the semiconductor area, and a read unit adapted to read out the signal from the semiconductor area, comprising:

an output step of outputting a signal for controlling the transfer switch so that a fall speed Voff for changing the transfer switch from an ON state to an OFF state has a relation 10 V/sec>Voff.

The above and other objects, features, and advantages of the present invention will become apparent from the following detailed description in conjunction with the accompanying drawings.

DETAILED DESCRIPTION OF THE PREFERRED EMBODIMENTS

The outlines of the embodiments of the present invention will be described below. The present inventors examined and found the "relationship between the fall speed and a residual image" shown in FIG. 8. FIG. 9 shows an example of a pulse waveform of a transfer switch. The fall speed means the speed of voltage drop during the trailing edge period shown in FIG. 9.

Figure 8:
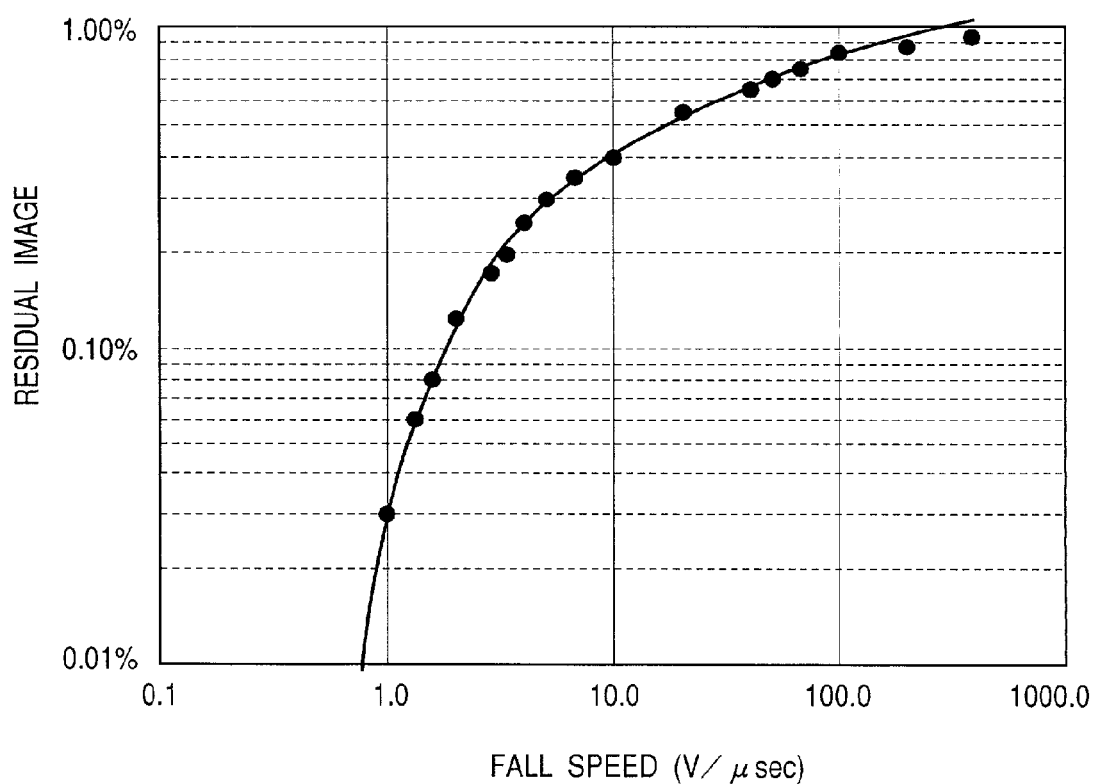
FIG. 8 is a graph showing the relationship between the fall speed and a residual image.
Figure 9:
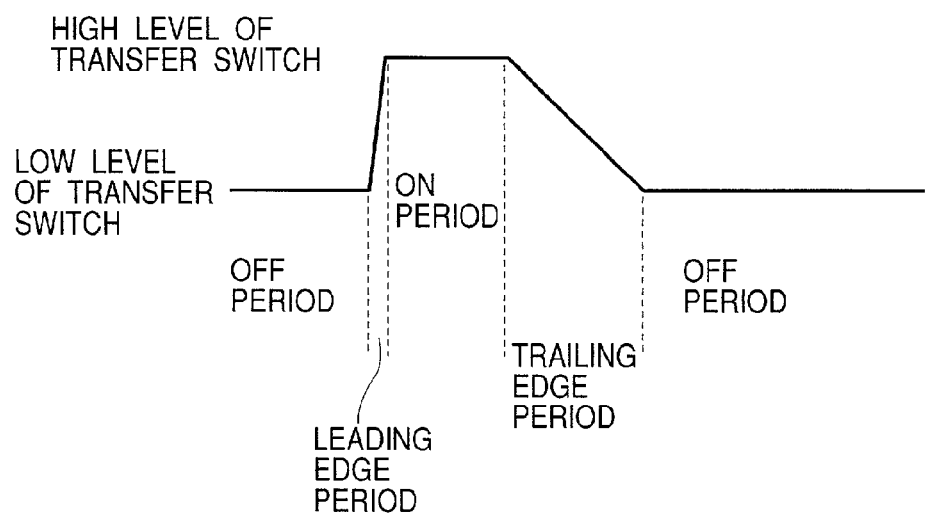
FIG. 9 is a waveform chart of an input to the gate of the transfer switch.

As shown in FIG. 8, as the fall speed becomes low, the residual image is reduced. When the fall speed is low, the time while the potential structure shown in FIG. 17D is maintained can be prolonged, and as a consequence, the residual charges can be removed to the floating diffusion area.

When the fall speed is set to 500 V/μsec, a residual image of about 1% is generated. Noise level allowable as an image is generally about −46 to −48 dB. When the fall speed is set to 500 V/μsec, that level cannot be satisfied. When the fall speed is set to 10 V/μsec, the above-described level can be satisfied, and a satisfactory image can be obtained.

Figure 17A:
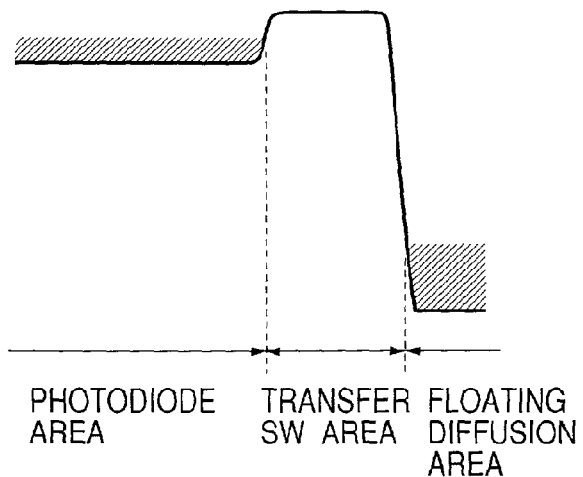
FIGS. 17A, 17B, 17C and 17D are potential charts for explaining conventional problems and the principle of the present invention.
Figure 17B:
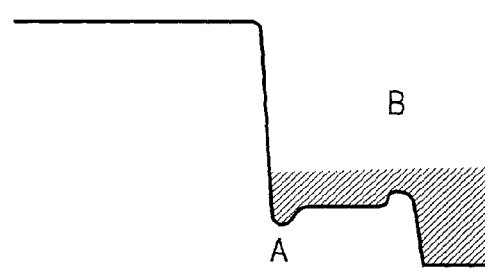
Figure 17C:
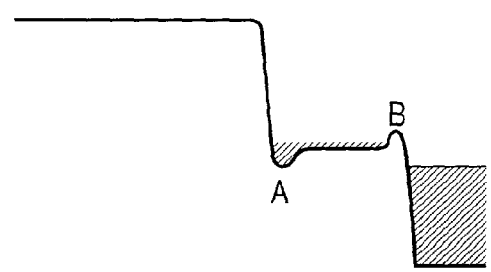
Figure 17D:
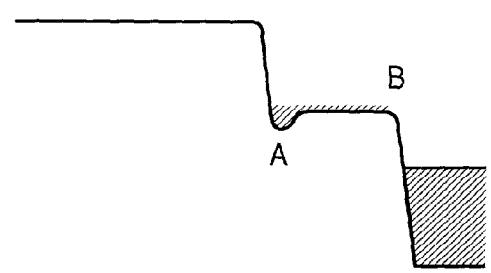

The characteristic features of the potential structure shown in FIG. 17D are that (1) the surface potential under the gate of the transfer switch is higher than the Fermi level of carriers in the floating diffusion area, and (2) the potential barrier at the portion B is eliminated by the influence of the drain field.

When the time while such a potential structure is maintained is prolonged, most residual charges under the gate of the transfer switch can be removed to the floating diffusion area.

Figure 10:
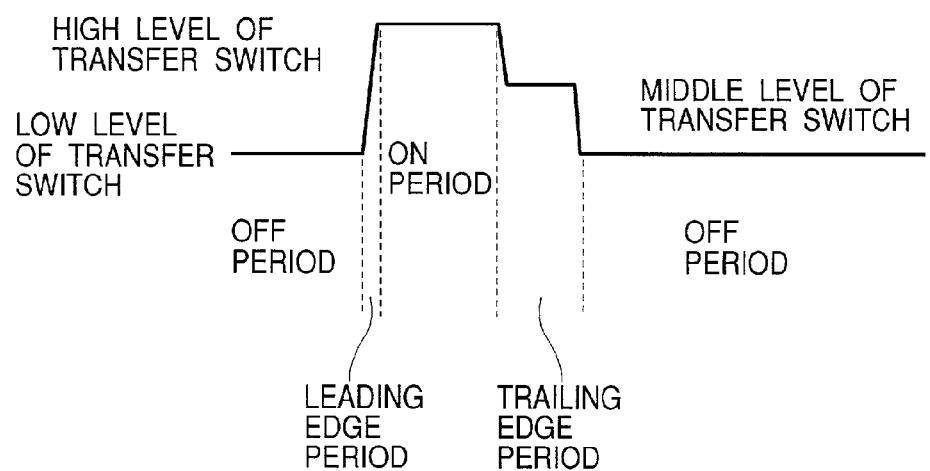
FIG. 10 is a waveform chart of an input to the gate of the transfer switch.
Figure 11:
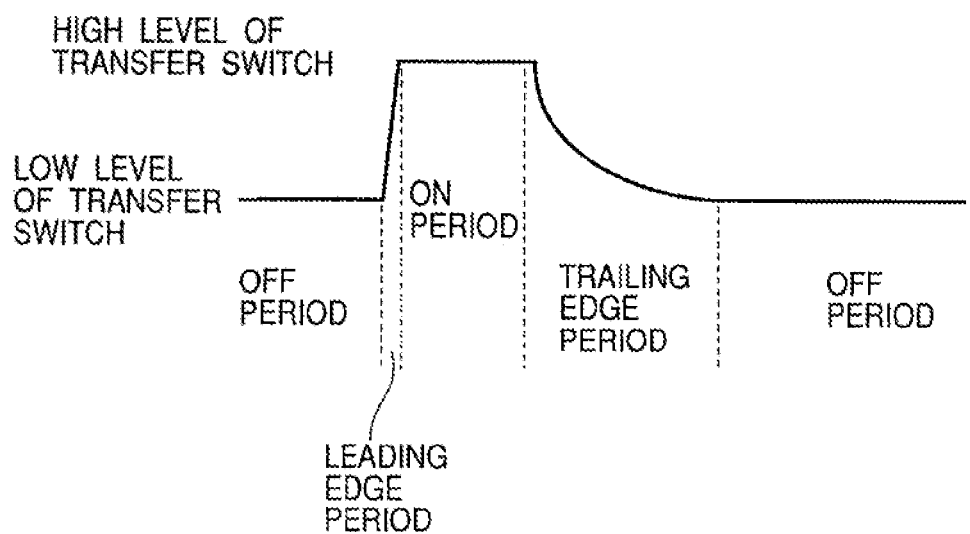
FIG. 11 is a waveform chart of an input to the gate of the transfer switch.

It is important to hold the potential structure shown in FIG. 17D for a predetermined time. For example, a ternary pulse which temporarily holds the voltage for generating the potential structure shown in FIG. 17D and then is turned off may be used, as shown in FIG. 10. The pulse is not limited to a ternary pulse, and any other multilevel pulse may be used. A waveform that exhibits curved level attenuation as shown in FIG. 11 may also be used.

The embodiments of the present invention will be described below in detail with reference to the accompanying drawings.

The first embodiment of the present invention will be described.

Figure 1:
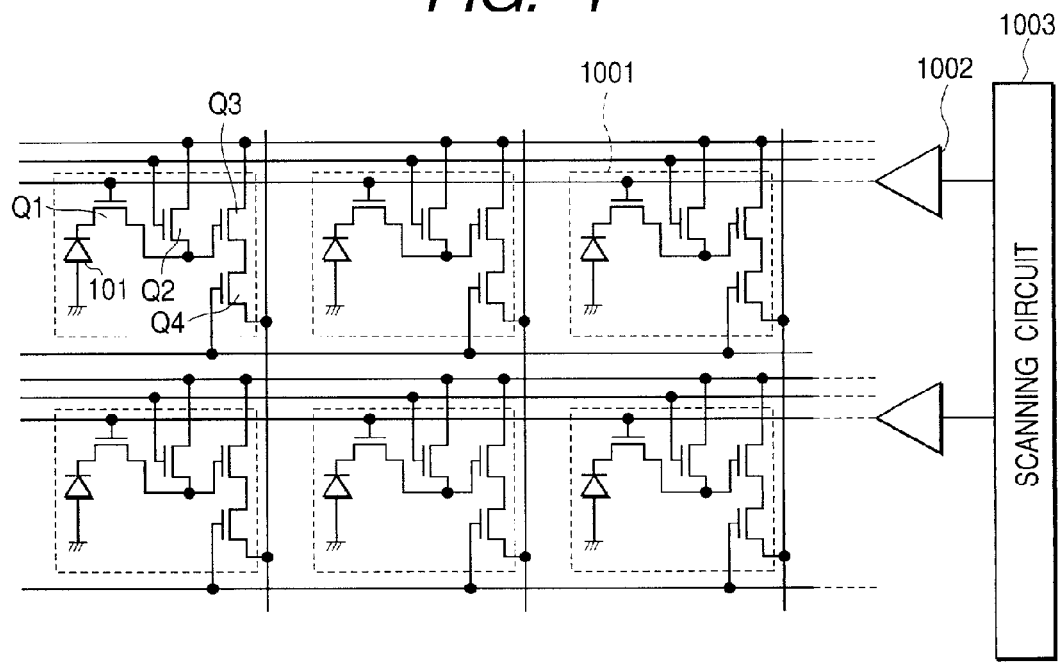
FIG. 1 is an equivalent circuit diagram showing the periphery of the gate drive circuit of a transfer switch used for an embodiment of the present invention.
Figure 13:
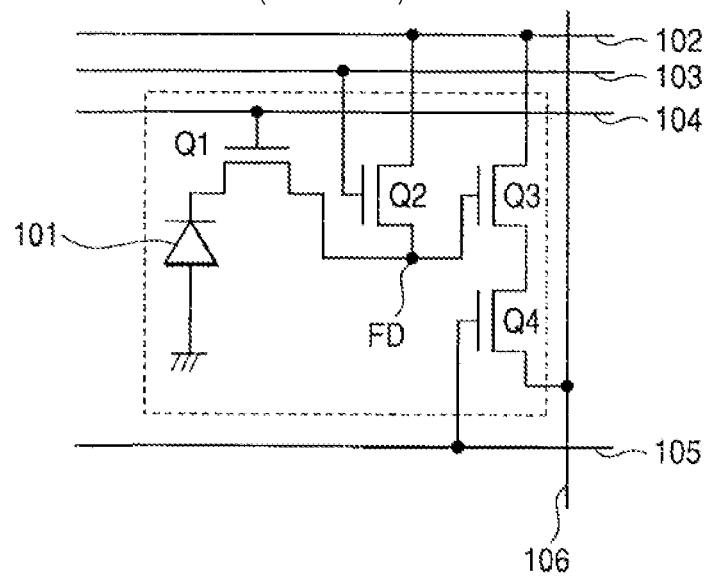
FIG. 13 is an equivalent circuit diagram of a typical pixel of an APS.
Figure 12:
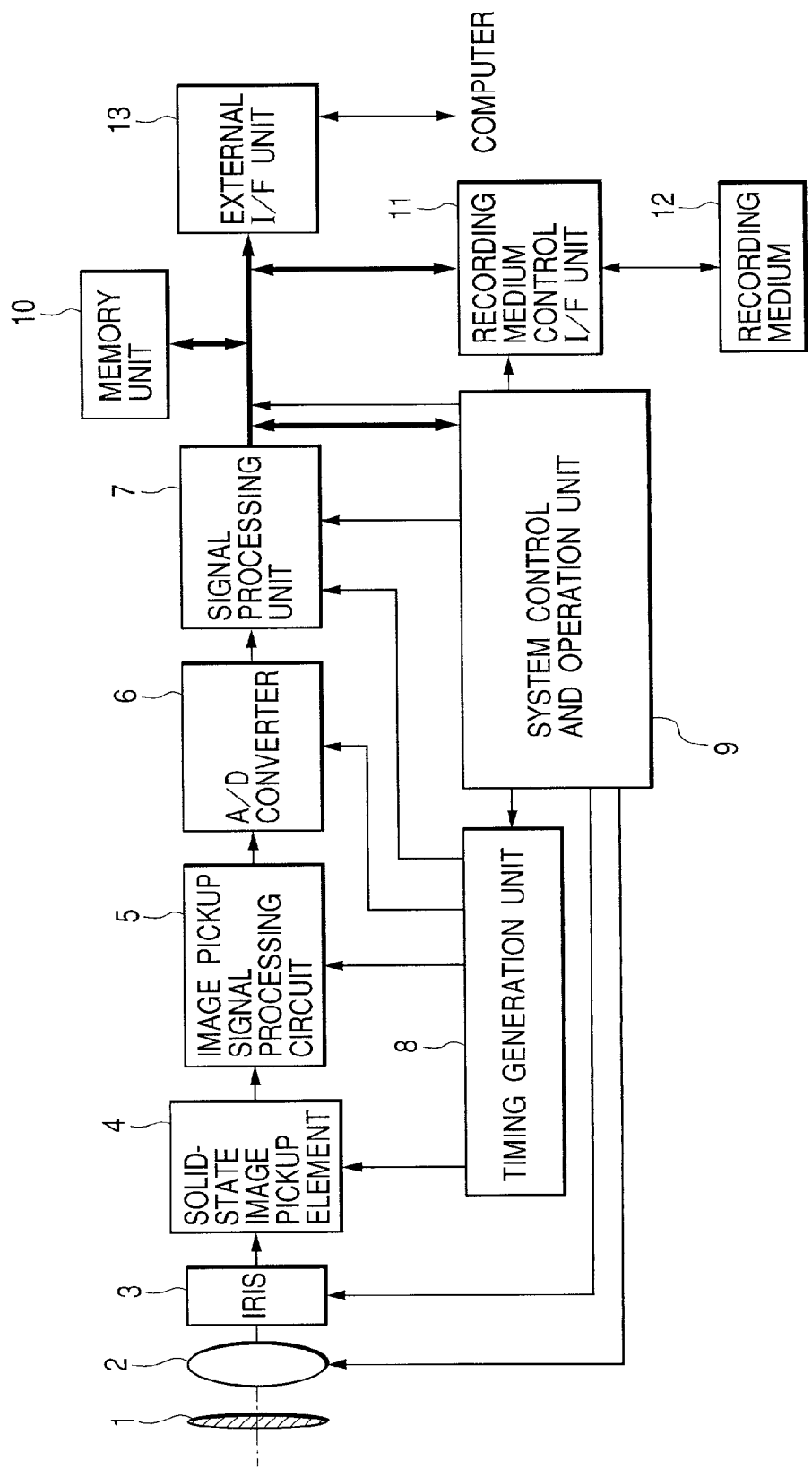
FIG. 12 is a block diagram showing a digital still camera.
Figure 14:
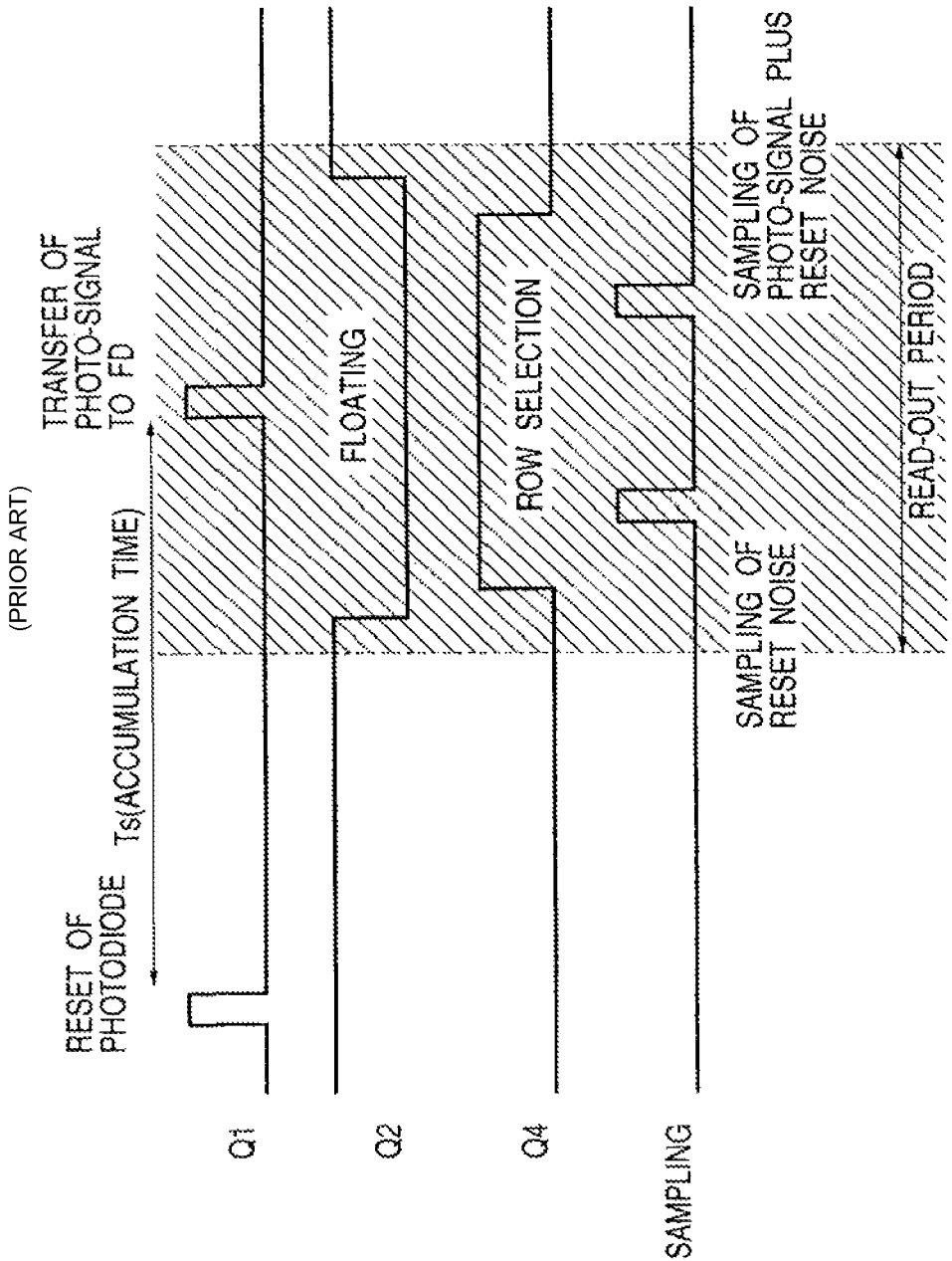
FIG. 14 is a drive timing chart of the APS.
Figure 15:
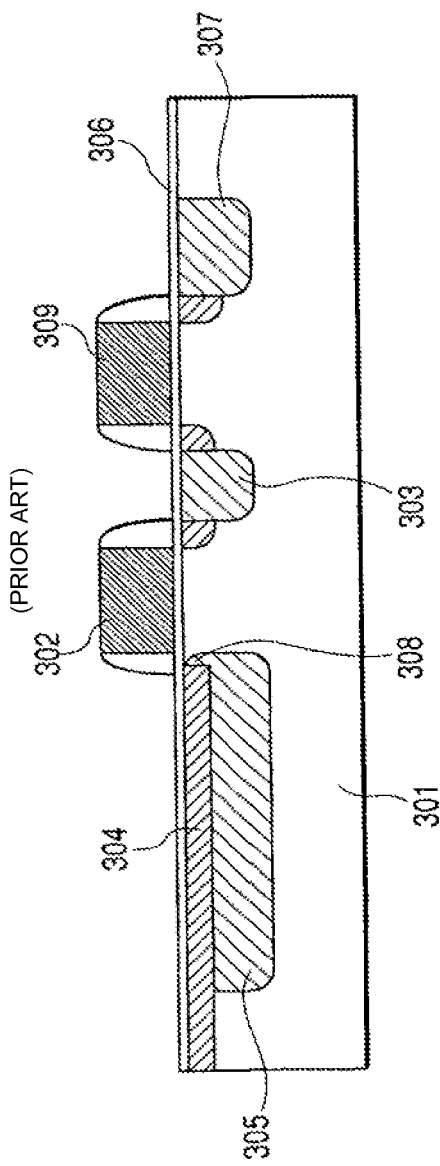
FIG. 15 is a sectional view of a photodiode, transfer switch, and floating diffusion area when a micropatterned MOS transistor is used.
Figure 16:
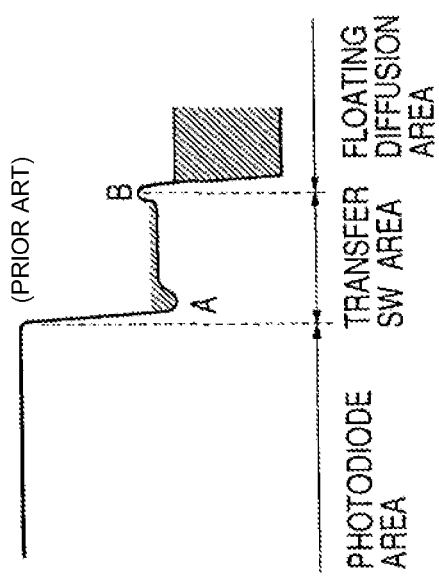
FIG. 16 is a potential chart corresponding to FIG. 13.

FIG. 1 is a circuit diagram schematically showing the periphery of the drive circuit of a transfer switch when a plurality of pixels shown in FIG. 12 are arrayed. The arrangement shown in FIG. 1 includes a pixel 1001 which has the same structure as that shown in FIG. 13, a gate drive circuit 1002 for operating a transfer switch Q1 in the pixel 1001, and a scanning circuit 1003 for controlling the transfer switches on each row basis.

Figure 2:
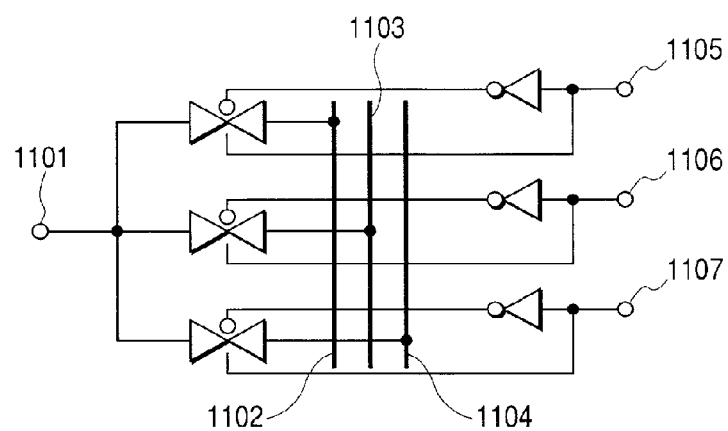
FIG. 2 is a circuit diagram of the gate drive circuit of a transfer switch used for the first embodiment.

In this embodiment, a waveform shown in FIG. 10 is formed using a gate drive circuit shown in FIG. 2. Referring to FIG. 2, to output a low level, middle level, and high level, the circuit is designed to input (1,0,0), (0,1,0), and (0,0,1) from the scanning circuit 1003 to input terminals 1105, 1106, and 1107 of the scanning circuit, respectively. In this case, "1" is HIGH level, and "0" is LOW level. The input terminals 1105, 1106, and 1107 of the scanning circuit are connected to the control terminals of switches. A low-level signal, middle-level signal, and high-level signal are output from a low-level supply line 1102, middle-level supply line 1103, and high-level supply line 1104 to an output terminal 1101 through the switches, respectively. The output terminal 1101 is connected to the gate of the transfer switch Q1 of the pixel 1001 shown in FIG. 1.

More specifically, the high level of the transfer switch is set to 5.0 V, the middle level to 3.0 V, and the low level to 0.0 V. The middle level holding time is 0.5 μsec. As a result, the residual image is reduced to 0.1% or less. In addition, random noise is suppressed. Particularly in the dark state, no random noise due to charge transfer is observed. As a result of this embodiment, the residual image is improved more than in the graph "fall speed vs. residual image" shown in FIG. 8. The probable reason for this is that the potential structure shown in FIG. 17D can be held for a longer time, as compared to the waveform shown in FIG. 9.

Figure 3:
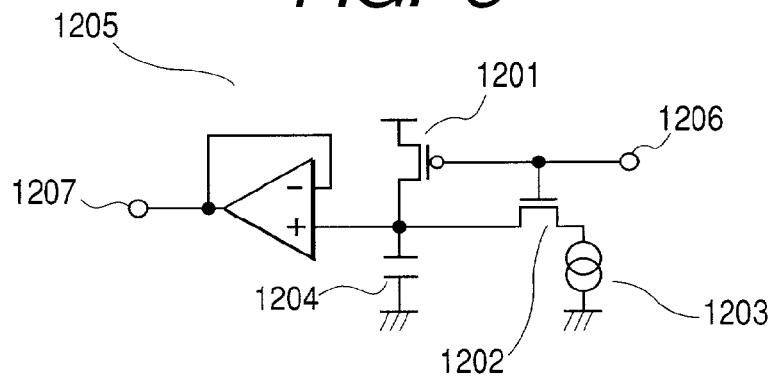
FIG. 3 is a circuit diagram of the gate drive circuit of a transfer switch used for the second embodiment.

FIG. 3 shows the gate drive circuit of a transfer switch according to the second embodiment of the present invention. An input terminal from a scanning circuit 1003 shown in FIG. 1 is represented by 1206 here. Referring to FIG. 3, the input terminal 1206 of the scanning circuit 1003 shown in FIG. 1 is connected to the gate of a PMOS transistor 1201 and the gate of an NMOS transistor 1202. The drain of the PMOS transistor 1201 and the drain of the NMOS transistor 1202 are commonly connected to a capacitor 1204 and the noninverting input terminal (+) of a voltage follower amplifier 1205. The source of the NMOS transistor 1202 is connected to a constant current source 1203. An output terminal 1207 is connected to the gate of a transfer switch Q1 of a pixel 1001 shown in FIG. 1.

The fall speed of the gate of the transfer switch Q1 is determined by the capacitance value of the capacitance 1204 and the current value of the constant current source 1203.

As a result, a trapezoidal waveform as shown in FIG. 9 is formed. In this embodiment, the fall speed is set to 10 V/μsec. Consequently, the residual image can be suppressed to 0.4%, as shown in FIG. 8. In addition, random noise due to charge transfer particularly in the dark state is not observed.

In the above-described first embodiment, the optimum gate voltage for forming the potential structure shown in FIG. 17D is 3.0 V. This voltage however changes due to the depletion voltage of the photodiode. That is, the voltage varies due to manufacturing variations, and consequently, the yield of samples capable of improving the residual image or random noise may decrease.

However, when a trapezoidal wave as in this embodiment is used, a predetermined time is actually held at any gate voltage. For this reason, even when the optimum gate voltage varies, the residual image and random noise characteristics are improved.

Figure 4:
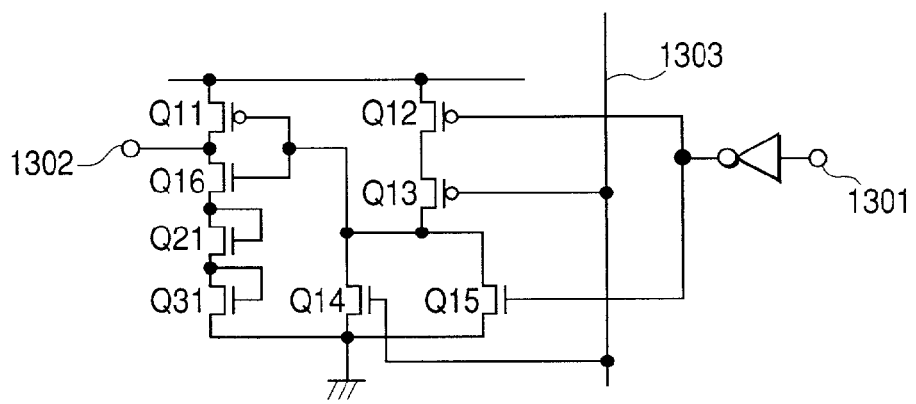
FIG. 4 is a circuit diagram of the gate drive circuit of a transfer switch used for the third embodiment.

FIG. 4 shows the gate drive circuit of a transfer switch according to the third embodiment of the present invention. An input terminal from a scanning circuit 1003 shown in FIG. 1 is represented by 1301 here. As MOS transistors, NMOS transistors are used.

Referring to FIG. 4, the input terminal 1301 of the scanning circuit 1003 shown in FIG. 1 is connected to MOS transistors Q12 and Q15 through an inverter. Between the power supply line and the GND line, MOS transistors Q12, Q13, and Q14 are connected in series, and MOS transistors Q11, Q16, Q21, and Q31 are connected in series. The MOS transistor Q15 is connected in parallel between the source and the drain of the MOS transistor Q14. The drain of the MOS transistor Q14 (connection point between the MOS transistor Q13 and the MOS transistor Q14) is commonly connected to the gates of the MOS transistors Q11 and Q16. An output terminal 1302 as the drain connection point between the MOS transistor Q11 and the MOS transistor Q16 is connected to the gate of a transfer switch Q1 of a pixel 1001 in FIG. 1.

In this embodiment, the device is designed such that the output from the scanning circuit for row selection goes high in the selection mode, and the common control line of the gate of the transfer switch goes low when turning on the transfer switch. As the transfer switch, an NMOS transistor is used.

This embodiment has the following characteristic features.

(1) The output unit is constructed by connecting NMOS transistors in series.

(2) The fall speed of the transfer switch is determined by the capacitance of the gate line of the transfer switch and the ON resistances of the MOS transistors Q21 and Q31.

The device is designed to have a fall speed of 10 V/μsec. To design a small current value by considering only the size of each NMOS transistor, a large space is required. However, with the arrangement of this embodiment, the drive circuit can be formed without largely changing the size. Since the blanking period during which charges are transferred from the photodiode has a temporal limitation, the rise speed in turning on the transfer switch must be high, as in the prior art. Hence, a leading edge time Ton and trailing edge time Toff has a relation Ton<Toff.

In this embodiment, the driving force in changing the control line of the transfer switch from the OFF state to the ON state is set to be actually higher than that in changing the transfer switch from the ON state to the OFF state, and the following characteristic can be obtained.

With the above arrangement, in this embodiment, a satisfactory solid-state image pickup element which has a residual image of 0.4% or less and is free from random noise in the dark state can be obtained.

In this embodiment, an NMOS transistor is used as the transfer switch, and NMOS transistors are used as MOS transistors of the gate drive circuit. However, the effect of this embodiment can also be obtained using a PMOS transistor as the transfer switch and PMOS transistors as the MOS transistors of the gate drive circuit.

Figure 5:
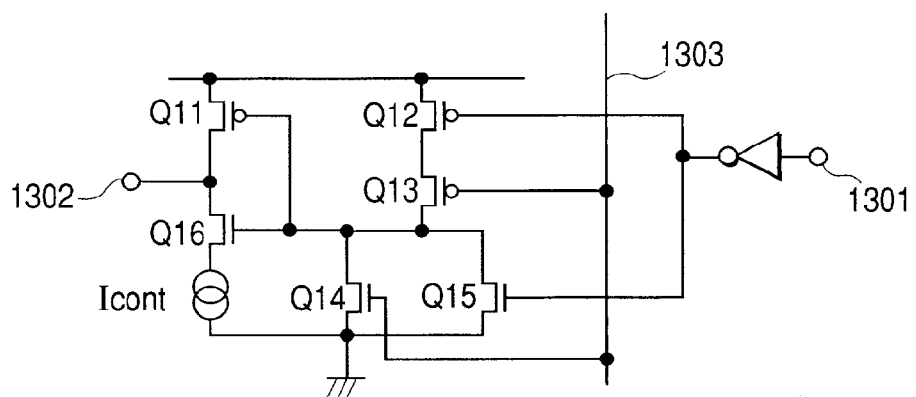
FIG. 5 is a circuit diagram of the gate drive circuit of a transfer switch used for the fourth embodiment.

FIG. 5 shows the gate drive circuit of a transfer switch according to the fourth embodiment of the present invention. The same reference numerals as in FIG. 4 denote the same members in FIG. 5. In this embodiment, a constant current source Icont is used in place of the MOS transistors Q21 and Q31 in FIG. 4, as shown in FIG. 5.

In this embodiment, the device is designed such that the output from a scanning circuit for row selection goes high in the selection mode, and the common control line of the gate of the transfer switch goes low when turning on the transfer switch. As the transfer switch, an NMOS transistor is used.

This embodiment has the following characteristic features.

(1) The output unit includes the constant current source.

(2) The fall speed of the transfer switch is determined by the capacitance of the gate line of the transfer switch and the current value of the constant current source.

The device is designed to have a fall speed of 1.5 V/μsec. Since the fall speed is determined by the constant current source, the fall speed cab be accurately designed, and a structure resistant against a variation in power supply voltage can be obtained. As a result, a satisfactory solid-state image pickup element which has a residual image of 0.1% or less and is free from random noise in the dark state can be obtained.

The fifth embodiment of the present invention will be described next.

In this embodiment, a gate drive circuit shown in FIG. 2 is used, and the high-level, middle-level, and low-level voltages are set to 6 V, 2.5 V, and 0 V, respectively. Referring to FIG. 12, the voltage of a power supply line 102 is set to 3.5 V, thereby reducing the reset voltage of the floating diffusion area to 3.5 V. Consequently, the device is driven such that the potential structure shown in FIG. 17B is formed when a signal in the dark state is read out.

If the pocket shown in FIG. 17A is very large, the linearity on the low illuminance side degrades. This is because the pocket is too large, and charges in the low illuminance area, that are small in number, are trapped by the pocket. When the high level of the transfer switch is set to be higher than the reset level of the floating diffusion area, as in this embodiment, the pocket is filled with charges from the floating diffusion area, and the linearity on the low illuminance side improves. However, only with this measure, random noise abnormally increases due to charges remaining in the pocket, resulting in large degradation in S/N ratio. According to the present embodiment, the random noise can be reduced by holding the middle level.

The sixth embodiment of the present invention will be described.

Figure 6:
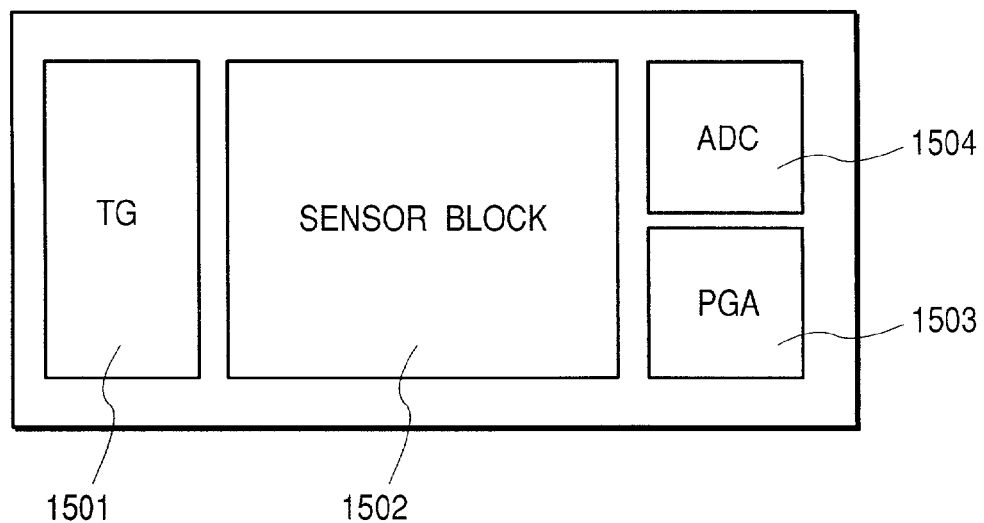
FIG. 6 is a view showing a one-chip solid-state image pickup apparatus according to the fifth embodiment.

In this embodiment, a sensor block using the gate drive circuit of the transfer switch of the first embodiment is used, thereby forming a one-chip solid-state image pickup apparatus with a 10-bit digital output, which has a block structure shown in FIG. 6. When the present invention is used, a high-performance TG (timing generation block) 1501, PGA (programmable gain control amplifier) 1503, and ADC (AD converter) 1504, which use a 0.35-μm general-purpose logic process, can be used while maintaining the sensor performance. Hence, an inexpensive digital solid-state image pickup element with high performance can be provided.

Figure 7:
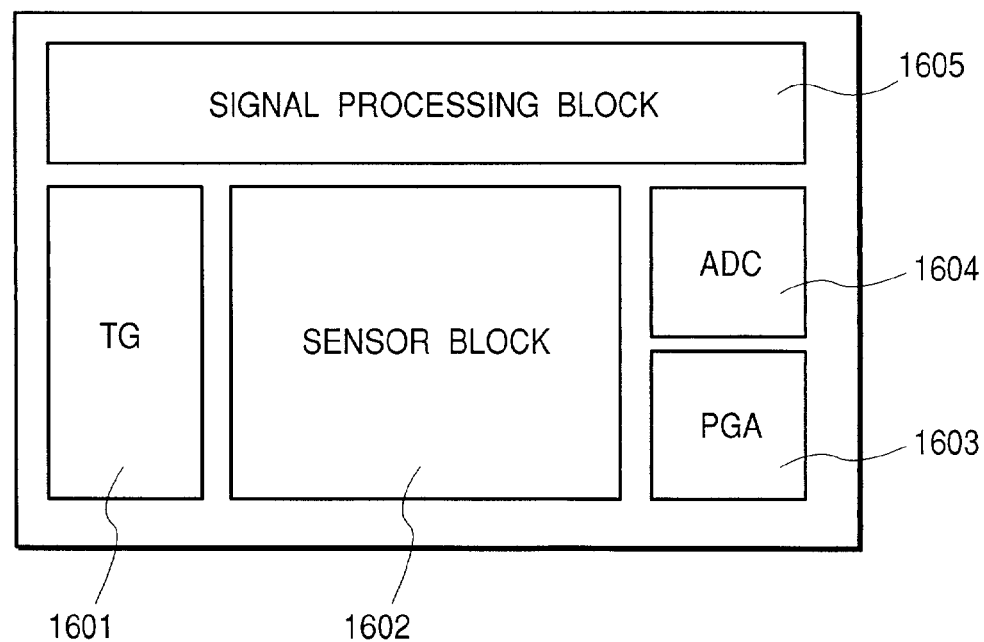
FIG. 7 is a view showing a one-chip solid-state image pickup apparatus according to the sixth embodiment.

In addition, a signal processing block 1605 for, e.g., image compression shown in FIG. 7 can be added.

As described above, according to the first to sixth embodiments, the following technological advantages can be obtained even in an APS using a micropatterned MOS transistor.

(1) A satisfactory solid-state image pickup element almost free from random noise or residual image can be provided.

(2) An inexpensive solid-state image pickup element that suppresses any degradation in characteristics due to a process variation can be provided.

(3) A one-chip solid-state image pickup element with an advanced function can be easily formed together with a high-performance logic circuit or analog circuit using a micropatterned MOS transistor.

An embodiment wherein the solid-state image pickup element and a gate drive circuit of any one of the above-described first to sixth embodiments is applied to a digital still camera will be described in detail with reference to FIG. 12.

Referring to FIG. 12, the camera has a barrier 1 serving as the protection and main switch of a lens, a lens 2 for forming an optical image of an object onto a solid-state image pickup element 4, an iris 3 for changing the amount of light transmitted through the lens 2, the solid-state image pickup element 4 for receiving the object image formed by the lens 2 as an image signal, an A/D converter 6 for executing analog-to-digital conversion of the image signal output from the solid-state image pickup element 4, a signal processing unit 7 for executing various kinds of correction operations for the image data output from the A/D converter 6 or compressing the data, a timing generation unit 8 (including a gate drive circuit) for outputting various kinds of timing signals to the solid-state image pickup element 4, image pickup signal processing circuit 5, A/D converter 6, and signal processing unit 7, a system control and operation unit 9 for executing various kinds of operations and controlling the entire digital still camera, a memory unit 10 for temporarily storing the image data, an interface unit 11 for recording/reading out the image data on/from a recording medium, a detachable recording medium 12 such as a semiconductor memory for recording or reading out image data, and an interface unit 13 for communication with an external computer or the like.

The operation of the digital still camera with the above-described arrangement in the phototaking mode will be described next.

When the barrier 1 is opened, the main power supply is turned on, the power supply of the control system is turned on next, and finally, the power supply of the image pickup system circuit such as the A/D converter 6 is turned on.

To control the exposure amount, the system control and operation unit 9 sets the iris 3 in the full-aperture state. The signal output from the solid-state image pickup element 4 is converted by the A/D converter 6 and input to the signal processing unit 7.

The system control and operation unit 9 executes calculation for exposure on the basis of the data.

The brightness is determined on the basis of the result of photometry, and in accordance with the result, the system control and operation unit 9 controls the iris.

On the basis of the signal output from the solid-state image pickup element 4, a high-frequency component is extracted, and the distance to the object is calculated by the system control and operation unit 9. After that, the lens is driven, and it is determined whether an in-focus state is obtained. If it is determined that defocus state is obtained, the lens is driven again, and distance measurement is performed.

After confirming the in-focus state, actual exposure starts.

When exposure is ended, the image signal output from the solid-state image pickup element 4 is A/D-converted by the A/D converter 6, passes through the signal processing unit 7, and is written in the memory unit by the system control and operation unit 9.

After that, the data stored in the memory unit 10 is recorded on the detachable recording medium 12 such as a semiconductor memory through the recording medium control I/F unit under the control of the system control and operation unit 9.

The image data may be directly input to a computer or the like through the external I/F unit 13 to process the image.

Many widely different embodiments of the present invention may be constructed without departing from the spirit and scope of the present invention. It should be understood that the present invention is not limited to the specific embodiments described in the specification, except as defined in the appended claims.

What is claimed is:

1. A solid-state image pickup device comprising:
a plurality of pixels each including a photoelectric conversion unit, a floating diffusion region, a transfer switch for transferring an electric charge from the photoelectric conversion unit to the floating diffusion region, and an amplification transistor whose gate is electrically connected to the floating diffusion region; and
a scanning circuit for supplying a drive pulse to a control node of the transfer switch,
wherein the transfer switch is turned off by holding for a predetermined period a first level of the drive pulse supplied from the scanning circuit to the control node of the transfer switch, wherein the transfer switch is turned on by holding for a predetermined period a second level of the drive pulse supplied from the scanning circuit to the control node of the transfer switch, and wherein a first period for changing from the second level of the drive pulse to the first level of the drive pulse is longer than a second period for changing from the first level of the drive pulse to the second level of the drive pulse.

2. The device according to claim 1, wherein the scanning circuit is constructed to supply, to the transfer switch, a third level of the drive pulse between the first and second levels of the drive pulse.

3. The device according to claim 2, wherein the third level is held for a predetermined period within the first period for changing from the second level to the first level.

4. The device according to claim 1, wherein an initial speed of change from the second level to the first level is larger than a speed of change from the first level to the second level.

5. The device according to claim 1, wherein the first period for changing from the second level to the first level is set to be longer than the second period for changing from the first level to the second level, to suppress the returning of an electric charge to the photoelectric conversion unit.

6. The device according to claim 1, wherein the photoelectric conversion unit includes a semiconductor region accumulating the electric charge, and a portion of the semiconductor region of the photoelectric conversion unit is arranged under a portion of a gate electrode of the transfer switch.

7. The device according to claim 1, wherein the transfer switch is a MOS transistor.

8. The device according to claim 1, wherein each pixel further includes a reset switch, so that the photoelectric conversion unit is reset by turning on the reset switch during a period of supplying the second level of the drive pulse to the transfer switch.

9. A solid-state image pickup device comprising:

a plurality of pixels each including a photoelectric conversion unit, a floating diffusion region, a transfer switch for transferring an electric charge from the photoelectric conversion unit to the floating diffusion region, and an amplification transistor whose gate is electrically connected to the floating diffusion region; and a scanning circuit for supplying a drive pulse to a control node of the transfer switch, wherein the transfer switch is turned off by holding for a predetermined period a first level of the drive pulse supplied from the scanning circuit to the control node of the transfer switch, wherein the transfer switch is turned on by holding for a predetermined period a second level of the drive pulse supplied from the scanning circuit to the control node of the transfer switch, and wherein a speed of change from the second level of the drive pulse to the first level of the drive pulse is equal to or lower than $10V/\mu sec$.

10. The device according to claim 9, wherein the scanning circuit is constructed to supply, to the transfer switch, a third level of the drive pulse between the first and second levels of the drive pulse.

11. The device according to claim 9, wherein an initial speed of change from the second level to the first level is larger than a speed of change from the first level to the second level.

12. The device according to claim 9, wherein the speed of change from the second level to the first level is set to be equal to or lower than $10V/\mu sec$, to suppress the returning of an electric charge to the photoelectric conversion unit.

13. The device according to claim 9, wherein the photoelectric conversion unit includes a semiconductor region accumulating the electric charge, and a portion of the semiconductor region of the photoelectric conversion unit is arranged under a portion of a gate electrode of the transfer switch.

14. The device according to claim 9, wherein the transfer switch is a MOS transistor.

15. The device according to claim 9, wherein each pixel further includes a reset switch, so that the photoelectric conversion unit is reset by turning on the reset switch during a period of supplying the second level of the drive pulse to the transfer switch.

16. A solid-state image pickup device comprising:

a plurality of pixels each including a photoelectric conversion unit, a floating diffusion region, a transfer switch for transferring an electric charge from the photoelectric conversion unit to the floating diffusion region, and an amplification transistor whose gate is electrically connected to the floating diffusion region; and a scanning circuit for supplying a drive pulse to a control node of the transfer switch, wherein a first period for changing from an ON state of the transfer switch to an OFF state of the transfer switch is longer than a second period for changing from the OFF state of the transfer switch to the ON state of the transfer switch.

17. The device according to claim 16, wherein the scanning circuit is constructed to supply, to the transfer switch, a middle level between a first level corresponding to the ON state and a second level corresponding to the OFF state.

18. The device according to claim 17, wherein the middle level is held for a predetermined period within the first period.

19. The device according to claim 16, wherein the scanning circuit is constructed to supply, to the transfer switch, a first level corresponding to the ON state and a second level corresponding to the OFF state, wherein an initial speed of change from the first level to the second level is larger than a speed of change from the second level to the first level.

20. A solid-state image pickup device comprising:

a plurality of pixels each including a photoelectric conversion unit, a floating diffusion region, a transfer switch for transferring an electric charge from the photoelectric conversion unit to the floating diffusion region, and an amplification transistor whose gate is electrically connected to the floating diffusion region; and a scanning circuit for supplying a drive pulse to a control node of the transfer switch, wherein a speed of change from an ON state of the transfer switch to an OFF state of the transfer switch is equal to or lower than $10V/\mu sec$.

21. A driving method of a solid-state image pickup device, wherein the solid-state image pickup device comprises a plurality of pixels each including a photoelectric conversion unit, a floating diffusion region, a transfer switch for transferring an electric charge from the photoelectric conversion unit to the floating diffusion region, and an amplification transistor whose gate is electrically connected to the floating diffusion region;

wherein the method comprises driving the transfer switch from an OFF state to an ON state and thence to the OFF state;

wherein a first period for changing from the ON state of the transfer switch to the OFF state of the transfer switch is longer than a second period for changing from the OFF state of the transfer switch to the ON state of the transfer switch.

22. A driving method of a solid-state image pickup device, wherein the solid-state image pickup device comprises a plurality of pixels each including a photoelectric conversion unit, a floating diffusion region, a transfer switch for transferring an electric charge from the photoelectric conversion unit to the floating diffusion region, and an amplification transistor whose gate is electrically connected to the floating diffusion region;
 wherein the method comprises driving the transfer switch from an OFF state to an ON state and thence to the OFF state;
 wherein a changing speed from the ON state of the transfer switch to the OFF state of the transfer switch is equal to or lower than 10V/μsec.

* * * * *